United States Patent [15] 3,702,897

Hidaka et al. [45] Nov. 14, 1972

[54] HUE CONTROL CIRCUIT FOR COLOR VIDEO SIGNAL

[72] Inventors: Tsuneyoshi Hidaka, Tokyo; Yoshihiko Honjo, Yokohama, both of Japan

[73] Assignee: Victor Company of Japan, Ltd., Yokohama-City, Kanagawa-ken, Japan

[22] Filed: June 30, 1970

[21] Appl. No.: 51,104

[30] Foreign Application Priority Data

July 4, 1969 Japan ......................44/53175
July 4, 1969 Japan ......................44/53176

[52] U.S. Cl. ............................................178/5.4 HE
[51] Int. Cl. ..............................................H04n 9/46
[58] Field of Search.....178/5.4 HE, 5.4 SY, 69.5 CB, 178/5.4 CD, 6.7 A, 5.4 AC, 5.4 CK

[56] References Cited

UNITED STATES PATENTS

| | | | |
|---|---|---|---|
| 3,018,324 | 1/1962 | Leyton et al. | 178/5.4 CD |
| 2,930,842 | 3/1960 | Leyton | 178/5.4 SY |
| 3,539,714 | 11/1970 | Krause | 178/5.4 SY |

*Primary Examiner*—Robert L. Griffin
*Assistant Examiner*—George G. Stellar
*Attorney*—Louis Bernat

[57] ABSTRACT

A hue control circuit has a phase shifting circuit which may be connected to a transmission line for a NTSC system color video signal. The phase shifting circuit is connected to the transmission channel only during every color burst signal period. The phase of the color burst signal of the color video signal is controlled by the phase shifting circuit so that the hue of the color video signal is controlled.

3 Claims, 3 Drawing Figures

INVENTORS
TSUNEYOSHI HIDAKA
YOSHIHIKO HONJO

BY [signature]
ATTORNEY

HUE CONTROL CIRCUIT FOR COLOR VIDEO SIGNAL

The present invention relates to a hue control circuit for color video signal, and more particularly to a circuit for controlling a hue of chrominance components of the NTSC system color video signal.

In the NTSC system in which the compatibility of black-and-white television with color television must be satisfied, a luminance signal and chrominance components of color video signal are generally transmitted by the same frequency band as a black-and-white video signal. For this purpose, two chrominance subcarriers having the same frequency, and 90° out of phase with each other, are respectively modulated in phase by two chrominance components ($E_I$, $E_Q$). These right angle modulated waves are composed signals superposed on a luminance signal ($E_Y$) for transmission. The subcarrier carrying the chrominance components causes a difference in hue by shifting its phase. For color synchronization a color burst signal is inserted on the back-porch of the horizontal synchronizing pulse of the video signal. The color burst signal is a sinusoidal wave of 8 to 12 periods having the same frequency as the chrominance subcarrier (3.579545 MHz). The amplitude of the color burst signal is equal to the amplitude of the synchronizing signal pulse in peak-to-peak value.

A hue error will occur in a reproduced picture, unless the relation between the phase of the color burst signal and the phase of the chrominance subcarriers modulated by the chrominance components is correctly maintained. Accordingly, the relation between the phase of the color burst signal and that of the chrominance components must always be maintained correctly.

However, in reproducing a picture of a color video signal played back from a magnetic recording and reproducing apparatus for color video signal (color VTR), a phase error will sometimes occur due to characteristics of the color VTR circuit. This error causes a resulting change of hue in the reproduced picture. Similarly, a hue error will take place when there is an overlapping of a picture and other operations made by NTSC system color video signals taken out from several color coders. The necessity for hue control also arises when the color burst signal of NTSC system color video signal is changed to one of a different phase for pre-adjusting the hue of the picture to be reproduced from the color VTR in a color television system.

To meet the necessity for hue control as described hereinabove, a conventional hue control circuit effects hue control by replacing the color burst signal in a NTSC system color video signal by another new color burst signal having a correctly adjusted phase. This known hue control circuit comprises a means for taking out a color burst signal from an input NTSC system signal, a stable chrominance subcarrier source, a means for shifting the phase of a continuous wave of chrominance subcarrier supplied from the chrominance subcarrier source to a predetermined phase, a means for taking out the phase-shifted chrominance subcarrier during a color burst signal period only, and a means for inserting the taken-out chrominance subcarrier into a color burst signal part of the input NTSC system signal. Accordingly, the known circuit requires two switching circuits, namely a circuit (a burst keyer) for taking out the color burst signal from the input NTSC system signal and a circuit for taking out the chrominance subcarrier. This tends to cause an undesirable disturbing pulse (noise pulse) to be mixed in the NTSC system color video signal at switching time. Besides, phase adjustment for shifting the phase of the new color burst signal to be inserted in place of the taken out chrominance subcarrier requires a complicated operation. Moreover, a circuit for making the phase adjustment tends to become complicated and large.

Accordingly, the general object of the present invention is to provide a new and useful hue control circuit for color video signal by eliminating the disadvantages of the conventional circuit hereinabove described.

Another object of the invention is to provide a circuit which is capable of effecting hue control without requiring a chrominance subcarrier source and without taking out the color burst signal part of the NTSC system color video signal.

Still another object of the invention is to provide a circuit which is capable of adjusting a phase of a color video signal by shifting the phase of the color burst signal only during a period corresponding to the cOlor burst signal period of the input NTSC system color video signal.

A further object of the invention is to provide a circuit which is of a very simple circuit construction and still is capable of easily controlling the phase of the color video signal by having a phase shifting circuit connected only during a period corresponding to the color burst signal period.

A still further object of the invention is to provide a circuit for effecting hue control of a color video signal by having a resonant circuit connected only during a period corresponding to the color burst signal period and adjusting the phase characteristic of the resonant circuit.

A still further object of the invention is to provide a circuit for effecting hue control by having a delay circuit connected only during a period corresponding to the color burst signal period and adjusting the delay time of the delay circuit.

Further additional objects and advantages will become apparent from the description made hereinbelow with reference to the accompanying drawings, in which.

Figures 1, 2, 3:
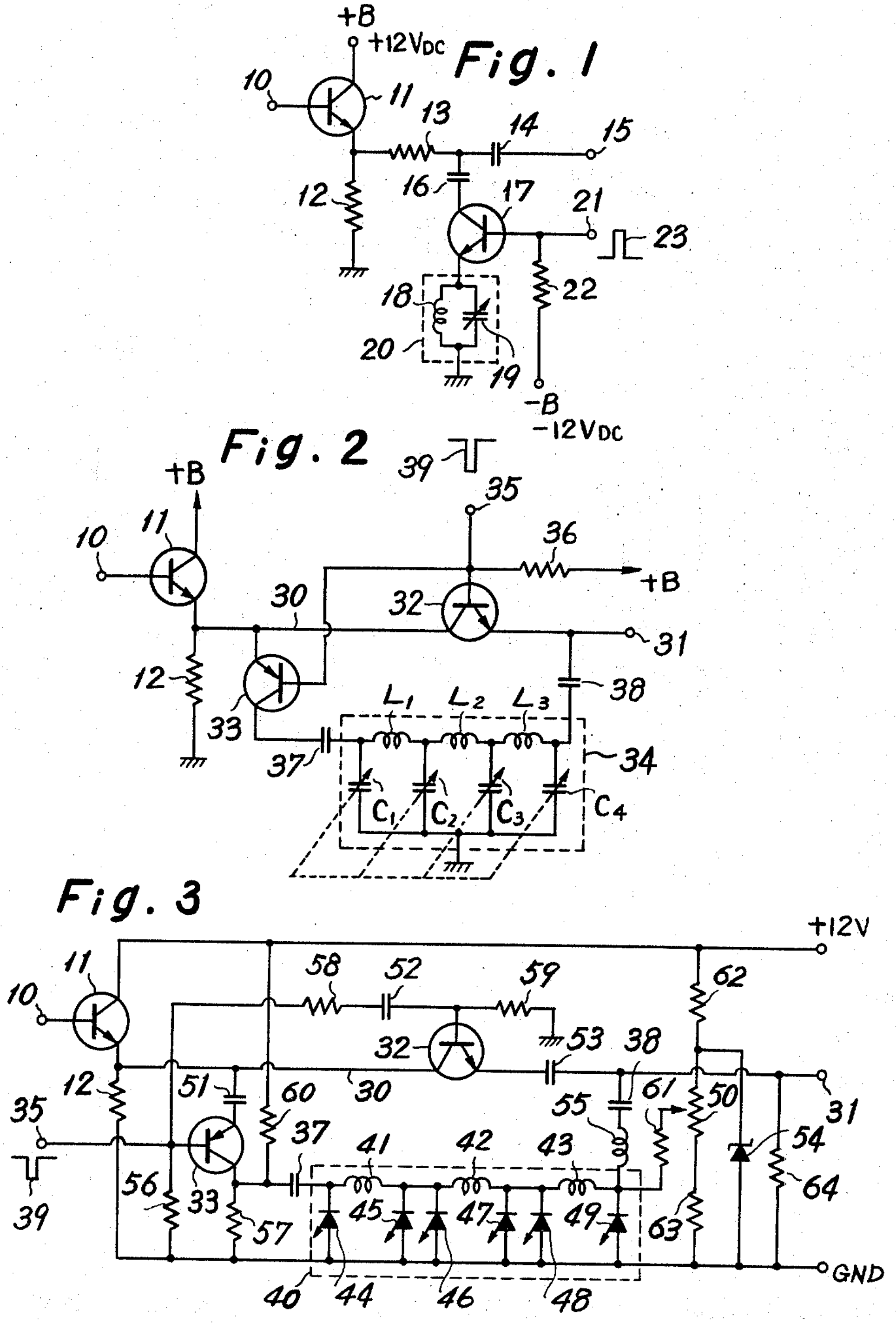
FIG. 1 is a circuit diagram showing one embodiment of a circuit according to the invention.
FIG.2 is a circuit diagram showing another embodiment of the circuit according to the invention.
FIG. 3 is a circuit diagram showing a modification of the embodiment shown in FIG.2.

Referring now to FIG.1, one embodiment of the present invention will be explained. An input NTSC system color video signal is applied through an input terminal 10 to the base of an emitter-follower amplifying transistor 11. This input signal appears as an output signal across a resistor 12 connected to the emitter of the transistor 11. This output signal is transmitted to an output terminal 15 through a resistor 13 and a capacitor 14. The collector of a switching transistor 17 is connected through a capacitor 16 to an interconnecting point between the resistor 13 and the capacitor 14. A parallel resonant circuit 20, consisting of a coil 18 and a variable capacitor 19, is connected between the emitter of the transistor 17 and the ground. A gate pulse input terminal 21 is connected to the base of the transistor 17. The collector of the transistor 11 is connected to +B power supply source, and the base of the transistor 17 is connected through a resistor 22 to −B power supply source.

During the time when a gate pulse is not coming in the terminal 21, a voltage of −12 V DC from the −B power source is applied through the resistor 22 to the transistor 17, nd the transistor 17 is in a non-conductive state. In this condition, the signal transmission line extending from the transistor 11 to the output terminal 15 is connected to only a high impedance of the non-conductive transistor 17. Accordingly, the NTSC system color video signal transmitted from the emitter circuit of the transistor 11 is taken from the output terminal 15 without being affected by the circuit including the transistor 17.

During the period which (is responsive) corresponds to the period of a color burst signal of the input NTSC system color video signal, a burst gate pulse 23 comes in the terminal 21. Pulse 23 has the same positive polarity as a burst flag pulse obtained by delaying a horizontal synchronizing pulse. The gate pulse 23 has the same width period as the burst signal period. When the positive gate pulse 23 is applied through the terminal 21 to the base of the transistor 17, the transistor 17 becomes conductive. As the transistor 17 becomes conductive, the parallel resonant circuit 20 is bridge connected as a load to the signal transmission line, extending between the emitter of the transistor 11 and the output terminal 15. The resonant circuit 20, consequently, operates as a kind of phase shifting circuit.

The inductance value of the coil 18 and capacitance value of the variable capacitor 19 are selected so that the parallel resonant circuit 20 is in resonance at either the frequency of the chrominance subcarrier (3.58 MHz) or the frequencies in the vicinity thereof. Accordingly, the color burst signal of the NTSC system color video signal transmitted through the signal transmission line, extending from the transistor 11 to the terminal 15, is shifted in its phase. The shift is under the influence of the parallel resonant circuit 20, thus connected to the transmission line. Changes in the capacitance value of the variable capacitor 19 cause the resonant characteristic to change, and thereby enable the phase of the color burst signal to be properly adjusted. Accordingly, a desirable color video signal, in which the hue is well controlled, is taken out from the terminal 15.

In the embodiment hereinabove described, the change in the resonant frequency of the resonance circuit 20 is effected by the change in the capacitance value of the variable capacitor 19. However, the means for effecting the change is not limited to this control of capacitance. A variable capacitance diode may be used in place of the variable capacitor. A coil of a variable inductance type may be used as the coil L. The parallel resonant circuit 20 is preferably constructed so that the sharpness of the resonance be sufficiently large (i.e., the selectivity be high).

As in the embodiment hereinabove described, the signal transmission line, extending to the output terminal, may also be connected to the output circuit of an emitter-follower transistor amplifier having a low output impedance. It is then desirable to have the resistor 13 connected to the signal transmission line as shown in the figure. This arrangement enhances phase-shifting action against the color burst signal when the parallel resonance circuit is bridge-connected.

In the embodiment illustrated hereinabove, the circuit of the transistor 11 is constructed as an emitter-follower amplifier to prevent the influence of the gate pulse applied to the transistor 17 from reaching the input circuit of the transistor 11. However, the circuit of the present invention is not limited to the aforementioned circuit shown in the figure.

The circuit constants of the elements forming the circuit of this embodiment are as follows;

| | |
|---|---|
| Resistor 12 | 1.5KΩ |
| 13 | 2.2KΩ |
| 22 | 68KΩ |
| Capacitor 14 | 0.01μF |
| 16 | 0.01μF |
| 19 | 30–50 PF |
| Coil 18 | 47μH |
| Transistor 11 | 2SC 372Y (Toshiba) |
| 17 | 2SC 372 (Toshiba) |

Another embodiment of the circuit, according to the present invention, will be described with reference to FIG.2. An input NTSC system color video signal is applied through the input terminal 10 to the base of the emitter-follower transistor 11. This input signal appears as an output across the resistor 12 connected to the emitter of the transistor 11 and is transmitted to a transmission line 30. An NPN type switching transistor 32 is provided in the transmission line 30 between the emitter of the transistor 11 and an output terminal 31.

A PNP type switching transistor 33 and a variable delay circuit 34, enclosed by a broken line, form a bypass of the transmission line 30 and are connected in parallel with the transistor 32. The bases of the transistors 32 and 33 are respectively connected to a gate pulse input terminal 35. The bases of the transistors 32 and 33 are also connected through a resistor 36 to +B power supply source. When a negative gate pulse does not appear at the terminal 35, the NPN transistor 32 is made conductive by a positive voltage +B applied through register 36 to the base thereof. The PNP transistor 33 is switched into a non-conductive state responsive to the same a positive voltage applied to the base thereof. The variable delay circuit 34 includes coils $L_1$, $L_2$, and $L_3$ and variable capacitors $C_1$, $C_2$, $C_3$, and $C_4$.

A gate pulse does not appear on the terminal 35 except during a period corresponding to the color burst signal period of the input NTSC system color video signal. The transistor 32 is normally in a conductive state, and the transistor 33 is in a non-conductive state. The emitter output of the transistor 11 is transmitted through the signal transmission line 30 to the output terminal 31 via the transistor 32. The emitter output is taken from the terminal 31 as an output signal.

During a period corresponding to the color burst signal period, a negative gate pulse 39 is applied to the terminal 35. Then, the transistor 32 becomes non-conductive when the gate pulse 39 from the terminal 35 is applied to the base thereof. The transistor 32 cuts off the transmission line 30. On the other hand, the transistor 33 becomes conductive when the gate pulse 39 is applied from the terminal 35 to the base thereof.

Accordingly, during a period corresponding to the color burst signal period, the emitter output of the transistor 11 is supplied through the transistor 33 and the capacitor 37 to the variable delay circuit 34. During this period, the emitter output is the color burst signal. The color burst signal supplied to the variable delay circuit 34 is delayed and shifted in its phase. The color burst signal, which has its phase adjusted by the circuit 34, reaches the output terminal 31 through a capacitor 38 and is taken out from the terminal 31.

The variable delay circuit 34 has a delay time which is varied by varying capacitance of the variable capacitors $C_1$, $C_2$, $C_3$, and $C_4$. This capacitance causes a proper controlling of the phase of the color burst signal.

A modification of the second embodiment (FIG.2) is shown in FIG.3. In FIGS. 2 and 3, the same circuit elements are indicated by the same reference numerals and the description thereof will be omitted. A variable delay circuit 40 includes coils 41 to 43 and variable capacitance diodes 44 to 49. As in the above embodiment shown in FIG.2, the output of the transistor 11 is transmitted through the signal transmission line 30 and via a transistor 32, is taken from the output terminal 31. This tranSmission occurs during the entire TV signal period, except when the color burst signal is present.

During a period corresponding to the color burst signal period, the burst gate pulse 39 is applied to the terminal 35. Then, the conductive and non-conductive states of the transistors 32 and 33 are reversed. Then the output of the transistor 11 is supplied through the transistor 33 to the variable delay circuit 40. The phase of the color burst signal is controlled by the variable delay circuit 40, according to the delay time thereof. This controlled signal is taken out from the output terminal 31. Thus, the color video signal in which hue has been controlled is taken out from the terminal 31.

The voltage applied to the variable capacitance diodes 44 to 49 is properly adjusted by adjusting a variable resistor 50. Thus, the capacitance values of these diodes are selected. Accordingly, the delay time of the variable delay circuit 40 is selected by properly adjusting the variable resistor 50. A zener diode 54 is provided for maintaining a constant voltage applied to the variable resistor 50.

In this embodiment the capacitors need not necessarily be of a variable type, and the coils may be of a variable inductance type.

Constants of the elements composing the circuit hereinabove described are as follows;

| | | |
|---|---|---|
| Resistor | **12** | 1.5 KΩ |
| | **56** | 6.8KΩ |
| | **57** | 1.0KΩ |
| | **58** | 270Ω |
| | **59** | 8.2KΩ |
| | **60** | 12KΩ |
| | **61** | 1.5KΩ |
| | **62** | 330Ω |
| | **63** | 12KΩ |
| | **64** | 330Ω |
| Capacitor | **37** | 0.01μF |
| | **38** | 130PF |
| | **51** | 0.01μF |
| | **52** | 0.01μF |
| | **53** | 100Pf |
| Variable capacitance diode | | |
| | **44** | Hv-23F |
| | **45** | do |
| | **46** | do |
| | **47** | do |
| | **48** | do |
| | **49** | do |
| Zener diode | **54** | RE 6A |
| Coil | **41** | 82μH |
| | **42** | 82μH |
| | **43** | 82μH |
| | **55** | 10μH |

In the embodiments hereinabove described, the constructions of the amplifier and the electronic switch etc. are not limited to those shown in the drawing but they may be suitably modified as necessary. Furthermore, this invention is not limited to these embodiments, but is intended to include all variations, equivalents, and modifications falling within the scope and spirit of the invention.

What we claim is:

1. A hue control circuit for a color video signal comprising a transmission line for transmitting a combination signal comprising a color video signal including a color burst signal from an input terminal to an output terminal, resonant circuit means for shifting the phase of color burst signals while they are included in said video signal, said resonant circuit including means for varying its resonant frequency, electronic switching means for selectively connecting the phase shifting circuit to the transmission line while said color burst signal is being transmitted through said transmission line, and means for applying a gate pulse to the electronic switching means, said electronic switching means being switched between conductive and non-conductive states responsive to the gate pulse applied by the gate pulse applying means, said electronic switching means including meanS for bridge-connecting the resonant circuit to the transmission line during the time when the switching means is turned on and in a conductive state responsive to said gate pulse, said gate pulse having a width equal to the duration of and synchronized with the color burst signal period of the color burst signal, whereby the phase of only said color burst signal as taken from the output terminal has its controlled phase and said color burst signal is not removed from the color video signal.

2. The circuit as defined in claim 1 in which said resonant circuit is a parallel resonant circuit having a resonant frequency at approximately the frequency of the subcarrier.

3. The circuit as defined in claim 1 in which said electronic switching means comprises a transistor having a base with a bias voltage applied thereto, said transistor being switched between a conductive and a non-conductive state when the gate pulse of a polarity opposite to that of said bias voltage is applied thereto.

* * * * *